United States Patent
Warrington, Jr.

(10) Patent No.: US 7,818,907 B1
(45) Date of Patent: Oct. 26, 2010

(54) ORNAMENTAL SUN VISOR COVER

(76) Inventor: Frank E. Warrington, Jr., 4333 Woodland Dr., Chesapeake, VA (US) 23321

( * ) Notice: Subject to any disclaimer, the term of this patent is extended or adjusted under 35 U.S.C. 154(b) by 229 days.

(21) Appl. No.: 12/049,215

(22) Filed: Mar. 14, 2008

(51) Int. Cl.
*B60J 3/02* (2006.01)

(52) U.S. Cl. .......................... 40/593; 40/643; 296/97.6

(58) Field of Classification Search ............. 40/591, 40/593; 224/312, 97.1, 97.5, 97.6; D12/147; 296/97.1, 97.5, 97.6
See application file for complete search history.

(56) References Cited

U.S. PATENT DOCUMENTS

| | | | |
|---|---|---|---|
| 2,931,114 A * | 4/1960 | Peterson | 40/644 |
| 3,649,068 A | 3/1972 | Moynihan | |
| 3,809,428 A | 5/1974 | Cohen | |
| 4,944,971 A | 7/1990 | McLaughlin | |
| 5,651,577 A | 7/1997 | Lacy | |
| 5,882,059 A * | 3/1999 | Romero | 296/97.6 |
| 5,967,587 A | 10/1999 | Collet et al. | |
| D432,490 S * | 10/2000 | Golenz | D12/417 |
| 6,176,539 B1 * | 1/2001 | Westerman | 296/97.6 |
| 6,231,108 B1 | 5/2001 | Nicol | |
| 7,044,531 B2 | 5/2006 | Schaad | |
| 7,216,918 B1 | 5/2007 | Runfola | |
| 2002/0074838 A1 | 6/2002 | Whiting et al. | |
| 2004/0094588 A1 * | 5/2004 | Klein | 224/312 |

FOREIGN PATENT DOCUMENTS

| | | |
|---|---|---|
| DE | 3634937 | 4/1988 |
| EP | 0628451 | 12/1994 |
| JP | 7149178 | 6/1995 |

* cited by examiner

*Primary Examiner*—Cassandra Davis
(74) *Attorney, Agent, or Firm*—Michael I. Kroll

(57) ABSTRACT

A sun visor cover that fits any vehicle sun visor, square, rectangular, oval or circular in shape and having personalized ornamental designs on its front surface. The sun visor cover provides elastic strips that allow it to be stretched and slipped over a vehicles sun visor, then the visor material is wrapped around the visor and secured by Velcro means. A sun visor mirror flap is provided, having a pocket that is sealed by means of Velcro, snap buttons, zippers or tie string.

Figure 1:
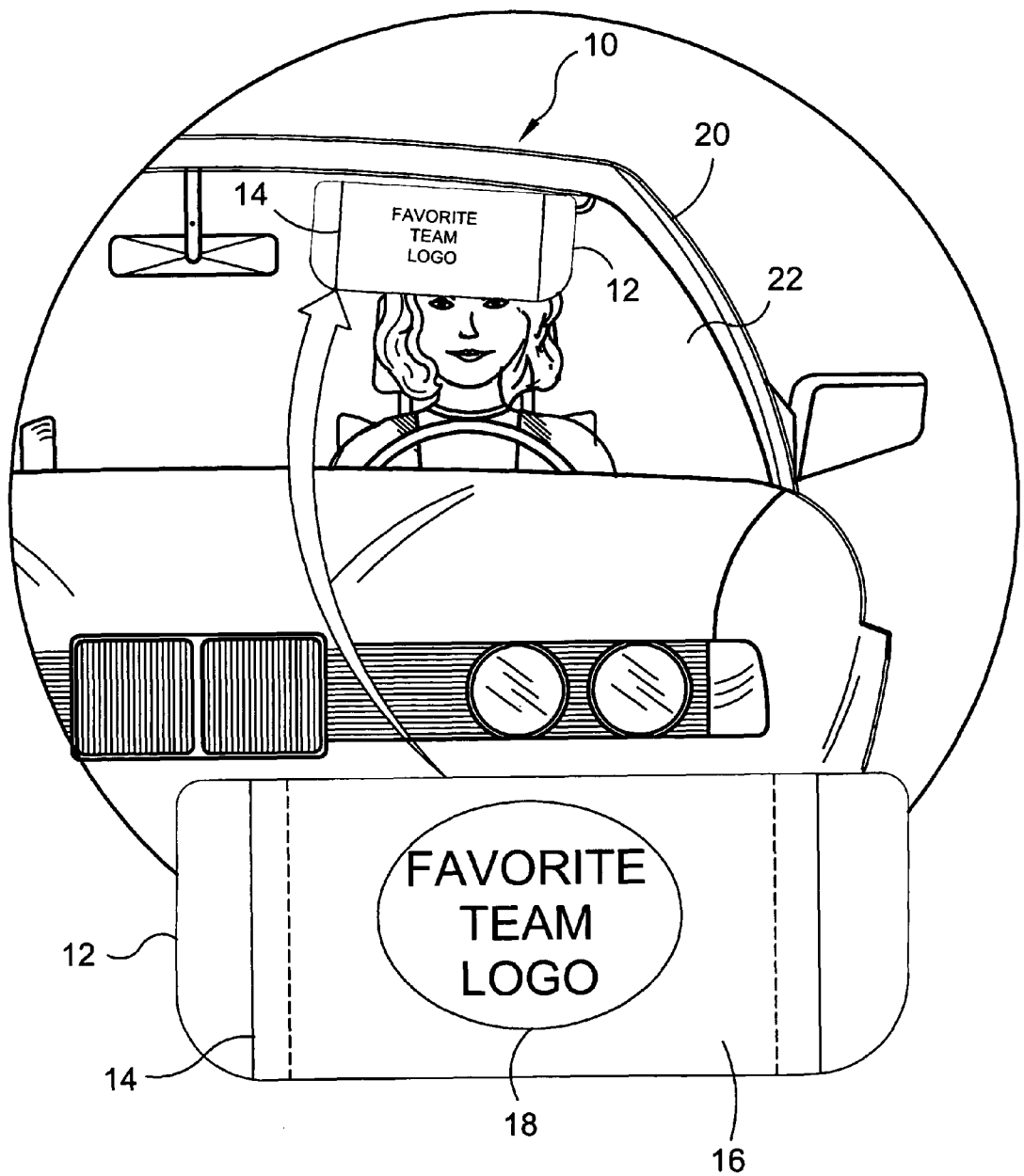

13 Claims, 19 Drawing Sheets

ORNAMENTAL SUN VISOR COVER

RELATED APPLICATIONS

This application is subject to U.S. provisional application Ser. No. 11/862,382 filed 27 Sep. 2007.

BACKGROUND OF THE INVENTION

1. Field of the Invention

The present invention relates generally to motor vehicles and, more specifically, to sun visor covers fitable to any size vehicular sun visor that serves to display personalized ornamental designs for motor vehicle sun visors when placed in a downward positioning.

The present invention concerns itself with the cost effective, personalized, ornamentation of a vehicle's sun visors by employing a sun visor cover that fits any vehicle sun visor, square, rectangular, oval or circular in shape and having personalized ornamental designs on its front surface. The sun visor cover provides elastic strips that allows it to be stretched and slipped over a vehicles sun visor, then the visor material is wrapped around the visor and secured by Velcro means. A sun visor mirror flap is provided, having a pocket that is sealed by means of Velcro. The pocket can be mesh, see through plastic or fabric. To utilize the visor mirror, the flap is separated from its mating Velcro and lifted to reveal the mirror. When attached to a sun visor, the sun visor cover has indicia on at least the front surface which is visible through the windshield of the vehicle when in the down position.

2. Description of the Prior Art

There are other covering devices designed for sun visors. Typical of these is U.S. Pat. No. 2,931,114 issued to Peterson on Apr. 5, 1960.

Another patent was issued to Moynihan on Mar. 14, 1972 as U.S. Pat. No. 3,649,068. Yet another U.S. Pat. No. 3,809,428 was issued to Cohen on May 7, 1974 and still yet another was issued on Jul. 29, 1997 to Lacy et al as U.S. Pat. No. 5,651,577.

Another patent was issued to Collet et al on Oct. 19, 1999 as U.S. Pat. No. 5,967,587. Yet another U.S. Pat. No. 6,231,108 was issued to Nicol on May 15, 2001. Another was issued to Whiting et al on Jun. 20, 2002 as U.S. Patent Application No. 2002/0074838 and still yet another was published on May 16, 2006 to Schaad as U.S. Pat. No. 7,044,531.

Another patent was issued to Runfola on May 15, 2007 as U.S. Pat. No. 7,216,918. Yet another Germany Patent No. DE3634937 was issued to Hessling on Apr. 21, 1988. Another was issued to Battaglia on Nov. 10, 1993 as European Patent Application No. EP 0628451 and still yet another was issued on Jun. 13, 1995 to Nerusu as Japan Patent No. JP149178.

U.S. Pat. No. 2,931,114

Inventor: Fred Peterson

Issued: Apr. 5, 1960

A one piece resilient device adapted to fold substantially around a motor vehicle sun visor consisting of a substantially rectangular body having a first and a second longitudinal edge, means for retaining articles adjacent the first longitudinal edge of said rectangular body, a longitudinal stitched seam adjacent said retaining means, said seam being positioned intermediate the first and second longitudinal edges of said rectangular body, an identifying placard secured to said rectangular body by a plurality of slots intermediate said seam and the second longitudinal edge of said rectangular body, and means for releasably securing said device to the sun visor.

U.S. Pat. No. 3,649,068

Inventor: John J. Moynihan

Issued: Mar. 14, 1972

In combination with a conventional sun visor for a vehicle, a sleeve mounted thereon for longitudinal adjustment with respect thereto, said sleeve having opposite sides cut out at opposite ends thereof to accommodate the hanger bracket for the sun visor and also to avoid interference with the mirror or other obstacle at the opposite ends of adjustment of the sleeve with respect to the visor.

U.S. Pat. No. 3,809,428

Inventor: Eli Cohen

Issued: May 7, 1974

A stretchable, tubular sleeve-like member provided with means thereon for the reception of various often used articles or objects and which is adapted to be mounted on the sun visor of a motor vehicle to thereby render such articles or objects easily accessible to the driver or passenger of a motor vehicle.

U.S. Pat. No. 5,651,577

Inventor: Jim Lacy

Issued: Jul. 29, 1997

A visor extension removably mountable on a vehicle visor to extend the shading or screening capability of the vehicle visor. The visor extension has a front panel and a rear panel joined together at their upper edges by a center strip that is shorter than the panels. The strip and the panels in combination form slots at each end of the center strip. Releasable mateable fasteners are provided on the lower edges of each panel to secure the visor extension on the vehicle visor. The visor extension is movable on the vehicle visor to enhance the shading capability. The formed slots permit the visor extension to be moved beyond an end attachment that attaches the visor to the vehicle.

U.S. Pat. No. 5,967,587

Inventor: Corbin L. Collet et al.

Issued: Oct. 19, 1999

The visor system of the present invention provides a unique visor control and visor in which a two-piece control receives an elongated pivot rod. The combined torque control and slide permit the visor panel to slide with respect to the pivot rod and comprises a lubricous polymeric slide which extends around the visor rod to provide a sliding interface between the visor rod and a torque spring which surrounds the polymeric member and allows the visor to be moved to desired adjusted positions. In a preferred embodiment of the invention, the slide comprises a segmented and partially split polymeric sleeve surrounding the visor rod. An adjustable cylindrical steel torque spring surrounds the sleeve and is secured to the visor body for providing the desired visor rotation and sliding action.

U.S. Pat. No. 6,231,108

Inventor: Blanche D. Nicol

Issued: May 15, 2001

A sun visor extension for a vehicle sun visor having a distal edge and a distal end thereof. The visor extension includes an elongated substantially flat sleeve formed of two generally rectangular panels attached together along each common side margin and open at each end of the sleeve. The sleeve has a width substantially wider than that of the sun visor and a length substantially no greater than that of the sun visor whereby the extension is adjustably slidable lengthwise on the sun visor and is laterally slidable to extend the distal edge of the sun visor downwardly when in use to increase eye shading for the driver or passenger of the vehicle. Mating two-part Velcro® along one side margin provides releasable attachment between the corresponding side margins of the panels to facilitate installation.

U.S. Patent Application Number 2002/0074838

Inventor: Joseph Whiting et al.

Issued: Jun. 20, 2002

An apparatus for covering a headrest and a visor, and more particularly a cover that can be used to cover both the headrest and the visor found in a vehicle. Also, the present invention pertains particularly to a headrest cover that is inflatable and to a visor cover that comprises a plurality of extendable portions. Furthermore, the present invention pertains particularly to a cover with an outer surface that comprises identifying indicia having parts of different light reflectivity. The invention has a particular application in covering a headrest and a visor in instances where there is a need to cover the headrest or the visor, so as protect the surface of the headrest or the visor from particles and other substances, or so as to provide on the headrest or the visor, identifying indicia having parts of different light reflectivity. Also, the present invention has application in providing an inflatable headrest cover so as to afford comfort or safety and in providing a visor cover with a plurality of extendable portions so as to provide additional area of light shielding coverage.

U.S. Pat. No. 7,044,531

Inventor: Nicole Schaad

Issued: May 16, 2006

A cover for an automobile sun visor comprises a front panel, a rear panel, a top margin or a lower margin, at least one aperture, and a seam. The cover is slidably placed onto a visor, and covers warning labels, protects the fabric from dust, dirt and other marring materials, and provides indicia about at least one panel of the cover.

U.S. Pat. No. 7,216,918

Inventor: Peter G. Runfola

Issued: May 15, 2007

A cover for a vehicle sun visor. The cover comprises a sleeve in which the sun visor is receivable through an open end thereof. The sleeve is elasticized to allow stretching of said sleeve for easily receiving and removal of the sun visor and to effect gripping of the received sun visor by the sleeve. A rear panel of the sleeve has an access opening which allows access to accessories on the sun visor. A flap panel preferably covers the rear panel and has one edge which is secured thereto and another edge which is releasably securable thereto so as to be liftable therefrom to allow access to the access opening. A front panel of the sleeve and the flap panel have indicia thereon or a surface upon which indicia can be provided.

German Patent Number DE3634937

Inventor: Eva Hessling

Issued: Apr. 21, 1988

The invention relates to a cover (1) which has compartments (3), can be produced in a simple fashion from an elastic hose section (2) by rolling up the end regions and flexibly adapts itself to the support in question in large areas. Compartments (3) of different sizes can be determined by means of longitudinal seams (4).

European Patent Application Number EP0628451

Inventor: Gianpaolo Battaglia

Issued: Dec. 14, 1994

This is a case (a) specially conceived to be applied to a motor vehicle's sun visor cover and foreseen to contain various objects which are utilizable by the driver when or when not driving. The case has various pockets (b,c,d,e,f,) also supplied with zippers (g) and can, for example, contain motor vehicle documents, money and change, sun glasses (n), combs, pens, pencils, and other. A main feature of the case is that it "covers" the sun visor and can be fastened to it by strip tape, or by straps, elastics, buttons or other. Therefore, the conceived case, can easily be taken off the sun visor and utilized by being carried on the owner's belt.

Japan Patent Number JP7149178

Inventor: Aaru Sumisu Nerusu et al.

Issued: Jun. 13, 1995

PURPOSE: To provide a functional and attractive accessory cover which can be easily manufactured by finishing a circumferential edge of a cloth-applied core which is covered with a layer of decoration material on the other side with an injection-molded rim of high polymer material for providing rigidity to the periphery. CONSTITUTION: A vanity mirror of a visor in a vehicle exists at a low position for the purpose of shielding sunlight, and when the mirror is not used for the reason of safety, it is covered with a cover for decoration and protection. In an illuminated vanity mirror assembly 20, a cover 30 mounted by a pivot includes a generally rectangular flat core 32, and the other side of it is covered with a layer of decoration material. A circumferential edge of the cloth-applied core 32 is surrounded by an injection-molded cirumferential edge rim of high polymer material. The rim can match interior of a specific vehicle and appearance of the visor, and the plastic material is proper material such as polycarbonate.

While these visor attachments may be suitable for the purposes for which they were designed, they would not be as suitable for the purposes of the present invention, as hereinafter described.

SUMMARY OF THE PRESENT INVENTION

A primary object of the present invention is to provide an ornamental cover for a motor vehicle sun visor.

Another object of the present invention is to provide an ornamental cover for a motor vehicle sun visor that is easily attached and detached, as the user desires.

Yet another object of the present invention is to provide an ornamental cover for a motor vehicle sun visor that substantially covers the visor without impinging the hardware or functionality of the visor.

Still yet another object of the present invention is to provide a sun visor cover comprising a sheet of material incorporating a graphic design or logo whereby the cover serves as personalized ornamentation of a motor vehicles sun visor or visors.

Another object of the present invention is to provide a sun visor cover wherein said graphic design or logo may incorporate luminescent or reflective elements.

Yet another object of the present invention is to provide elastic strips that allow the sun visor cover to be stretched and slipped over a vehicles sun visor, then the visor material is wrapped around the visor and secured by Velcro means.

Another object of the present invention is to provide a sun visor mirror flap is provided, having a pocket that is sealed by means of Velcro, snap buttons, zippers or tie string. The pocket can be mesh, see through plastic or fabric.

Still yet another object of the present invention is to provide a sun visor cover that is cost effective to manufacture.

Additional objects of the present invention will appear as the description proceeds.

The present invention overcomes the shortcomings of the prior art by providing a sun visor cover that fits any vehicle sun visor, square, rectangular, oval or circular in shape and having personalized ornamental designs on its front surface. The sun visor cover provides elastic strips that allow it to be stretched and slipped over a vehicles sun visor, then the visor material is wrapped around the visor and secured by Velcro means. A sun visor mirror flap is provided, having a pocket that is sealed by means of Velcro, snap buttons, zippers or tie string. The pocket can be mesh, see through plastic or fabric. To utilize the visor mirror, the flap is separated from its mating Velcro and lifted to reveal the mirror. When attached to a sun visor, the sun visor cover has indicia on at least the front surface which is visible through the windshield of the vehicle when in the down position.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Figure 2:
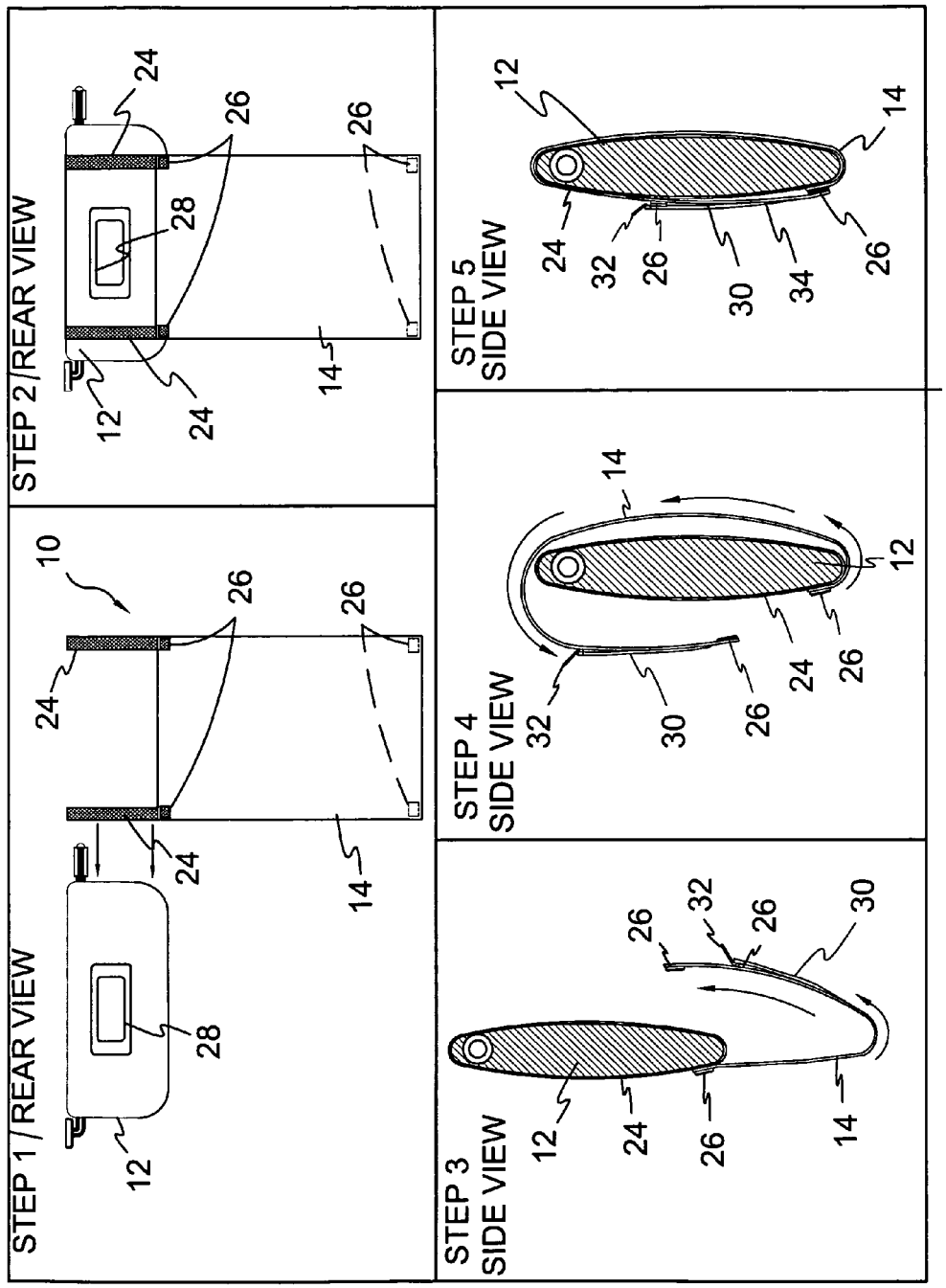
Figure 3:
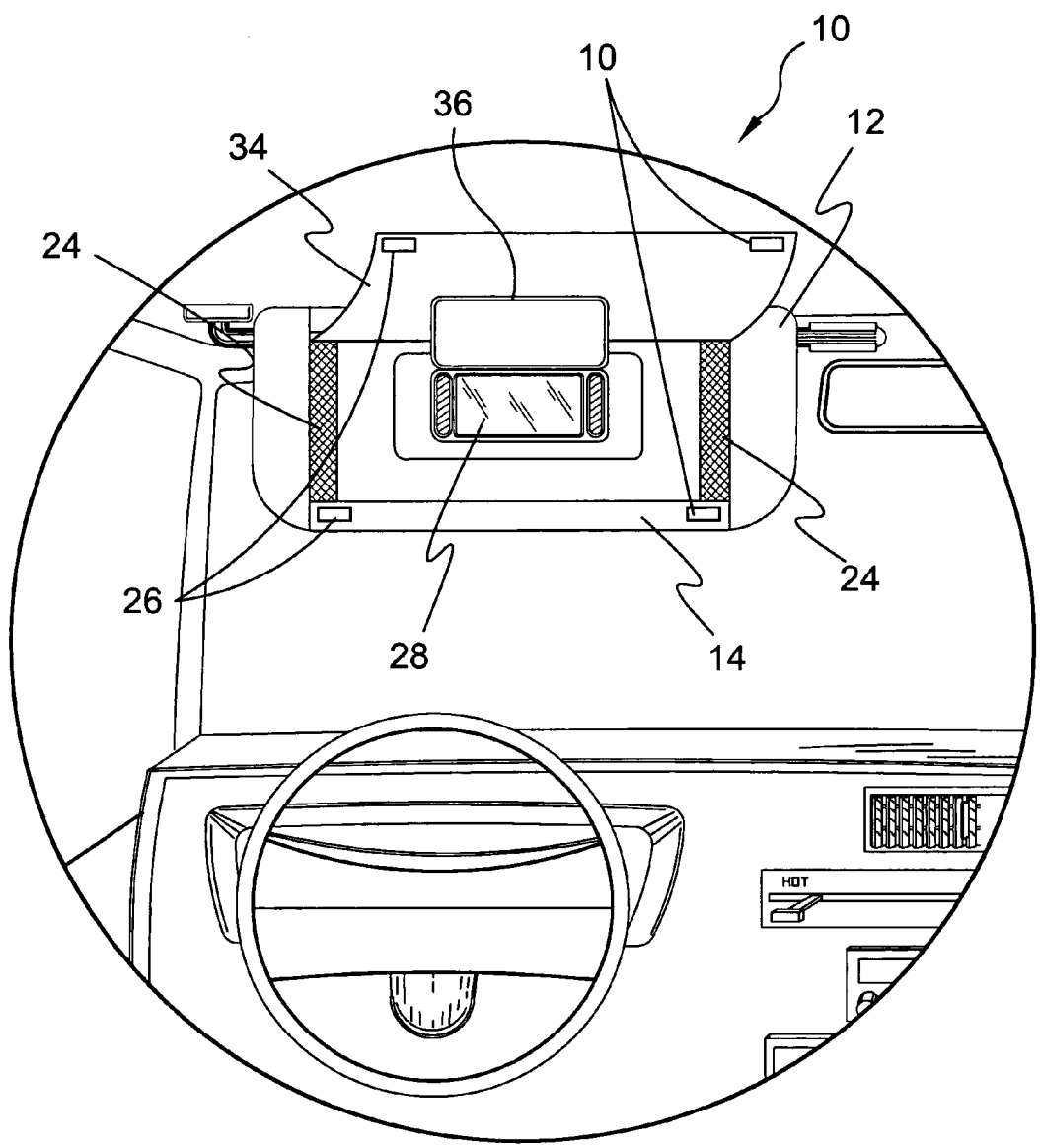
Figure 4:
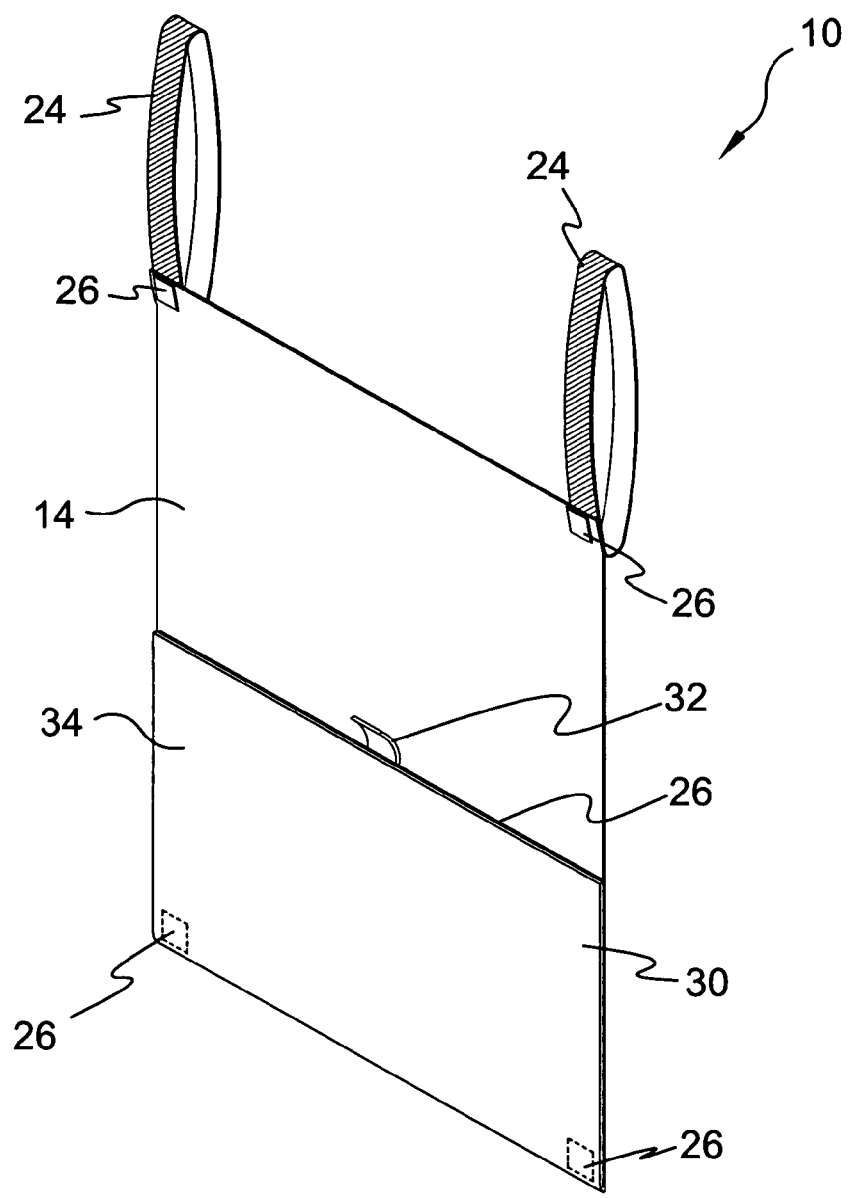
Figure 5:
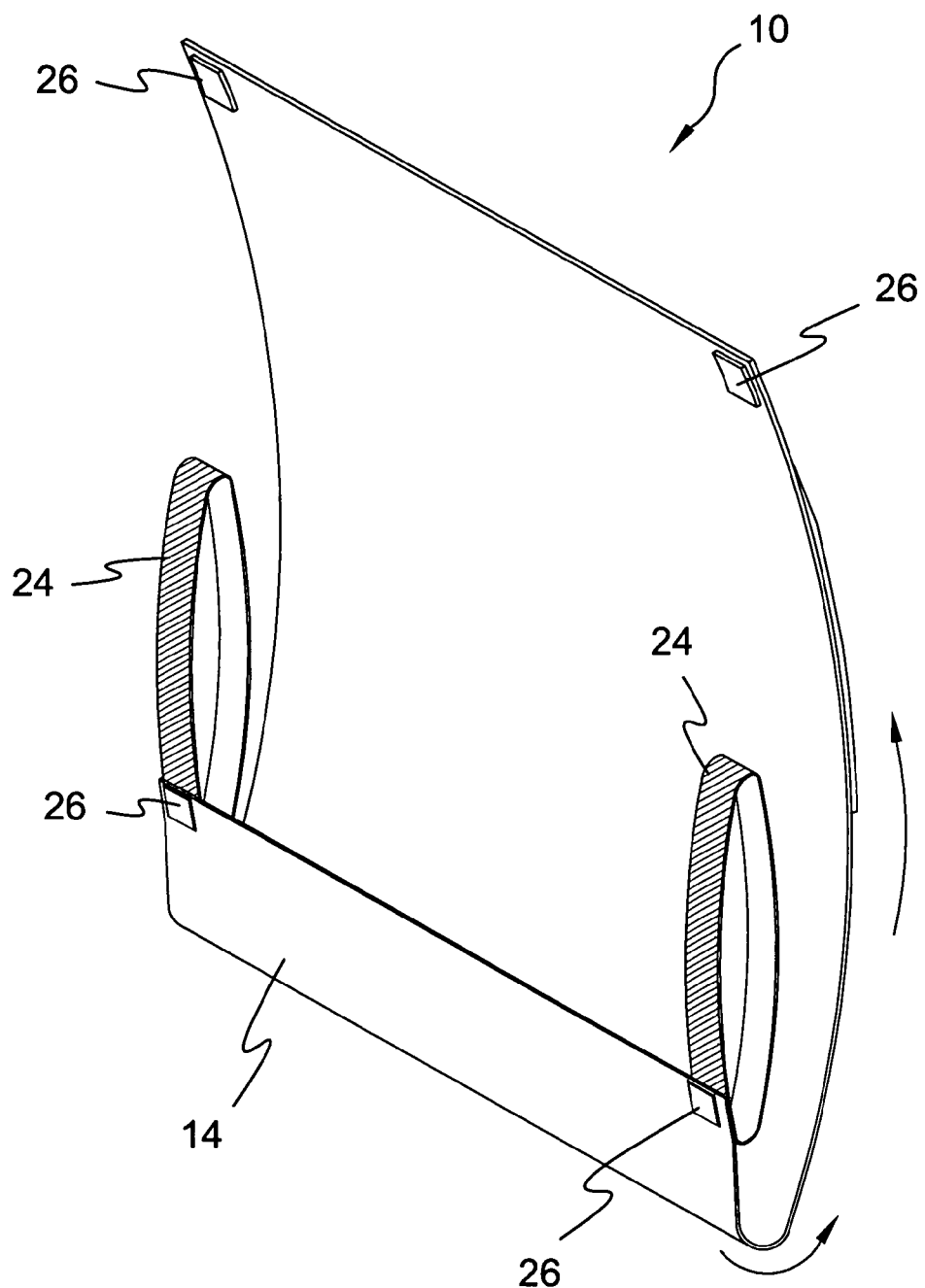
Figure 6:
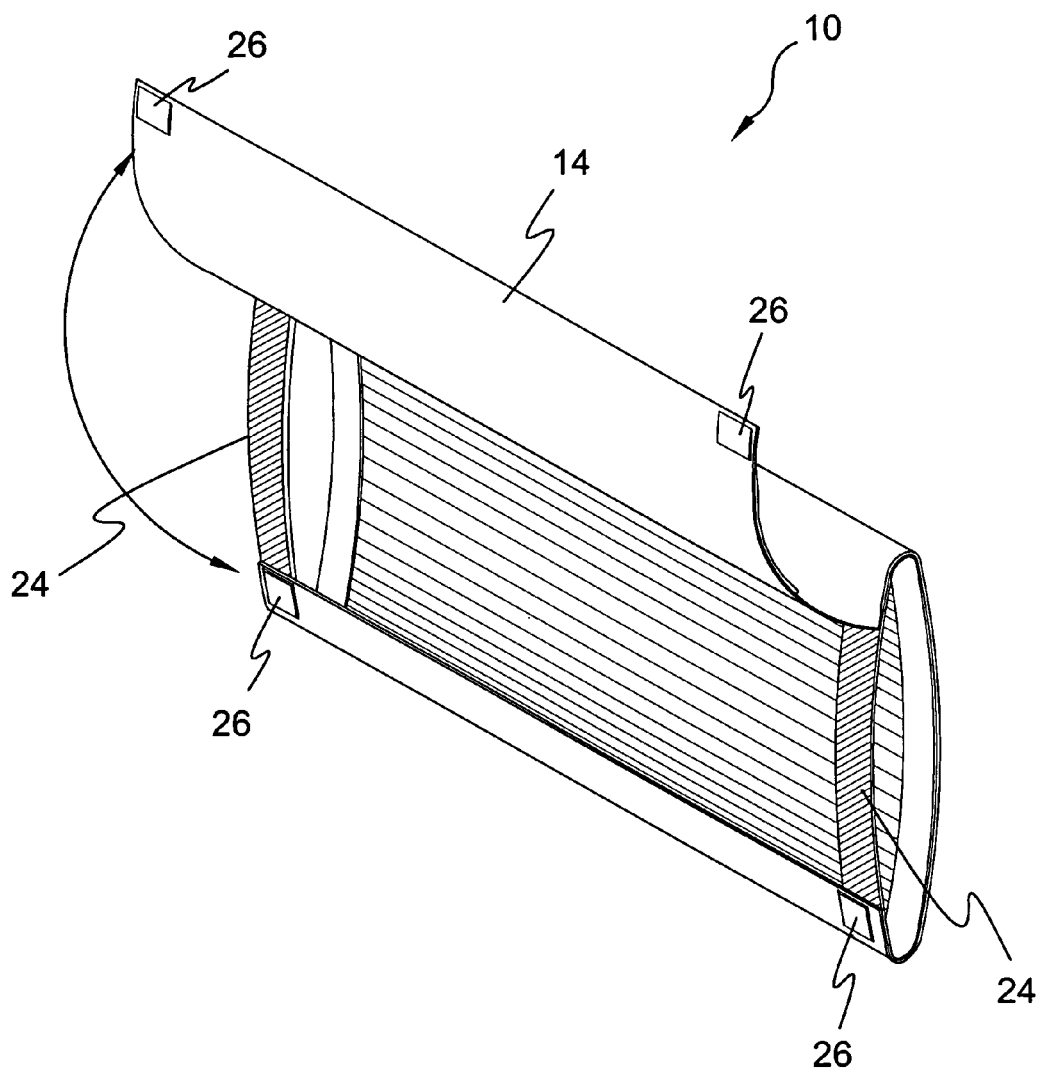
Figure 7:
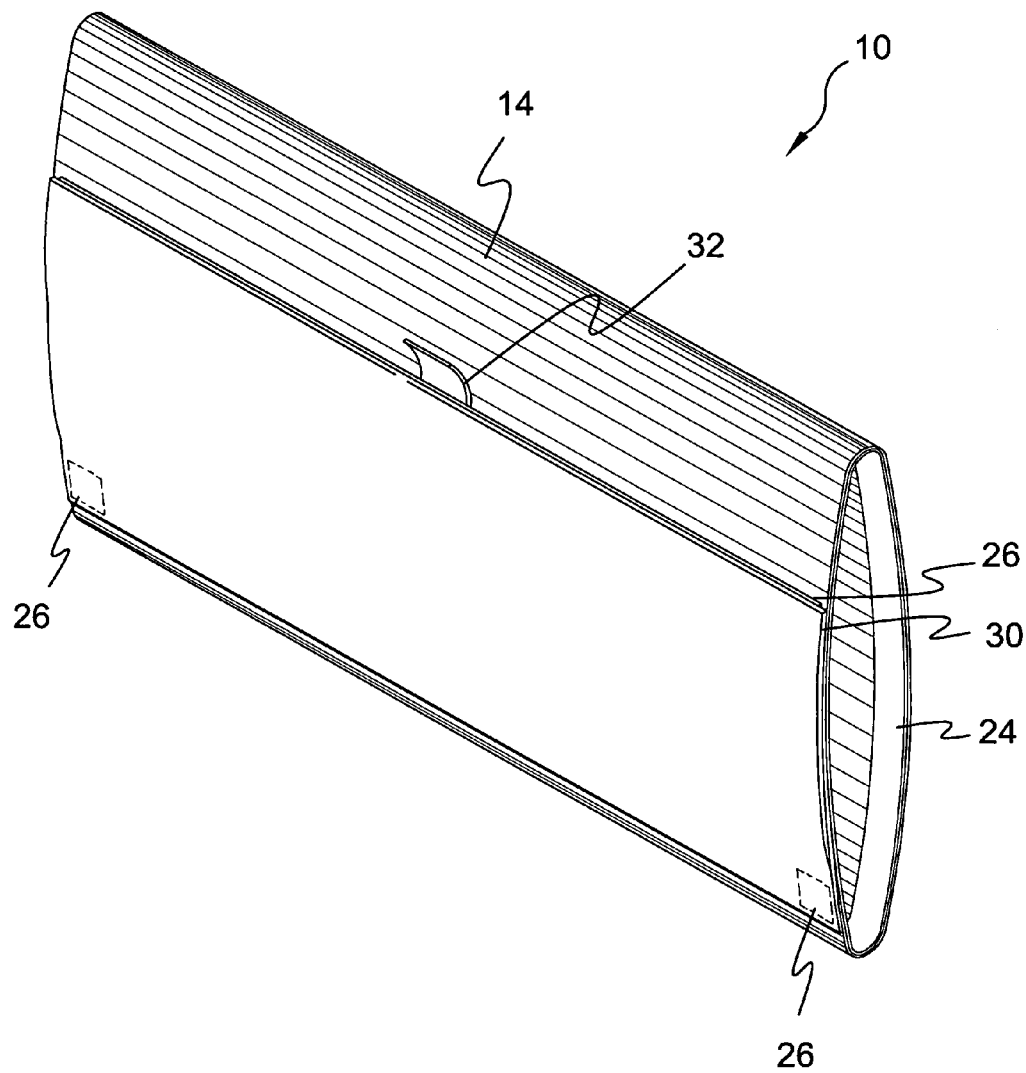
Figure 8:
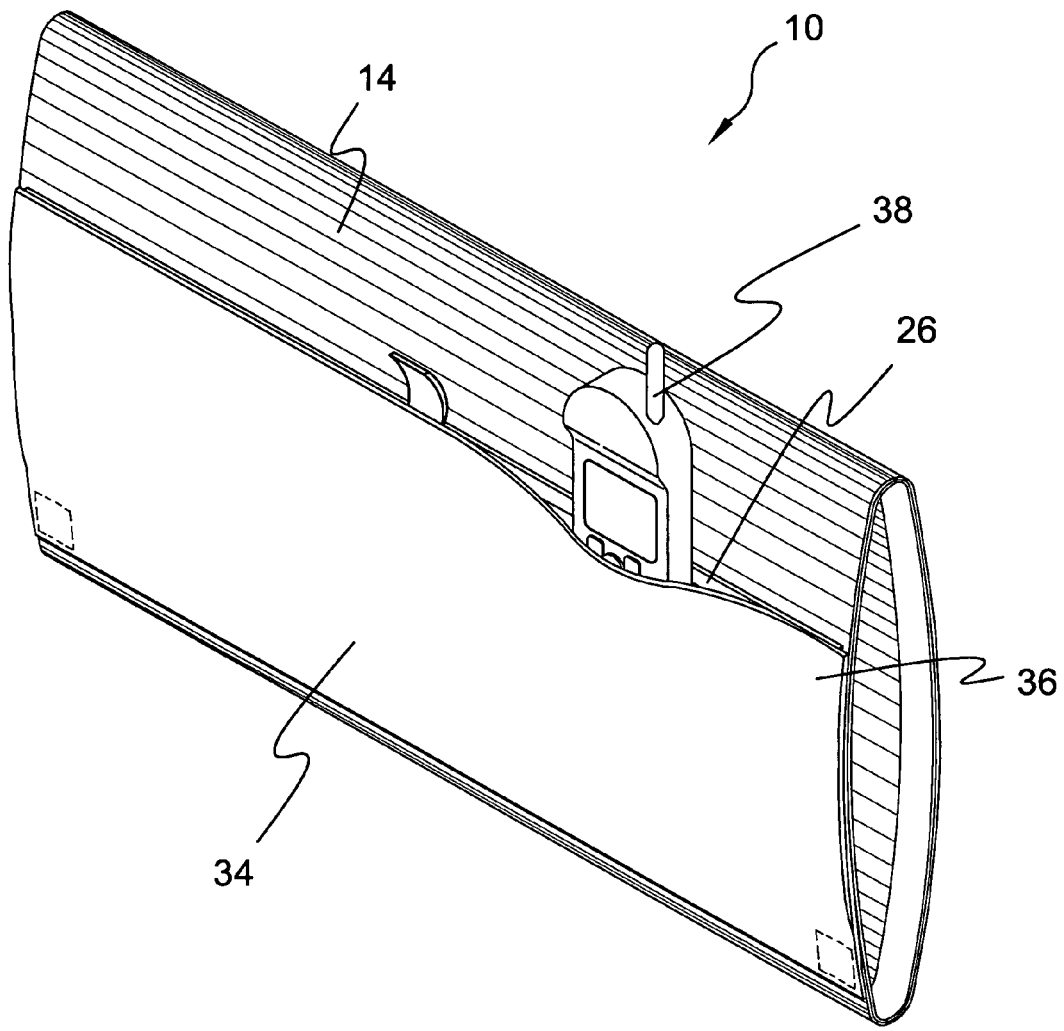
Figure 9:
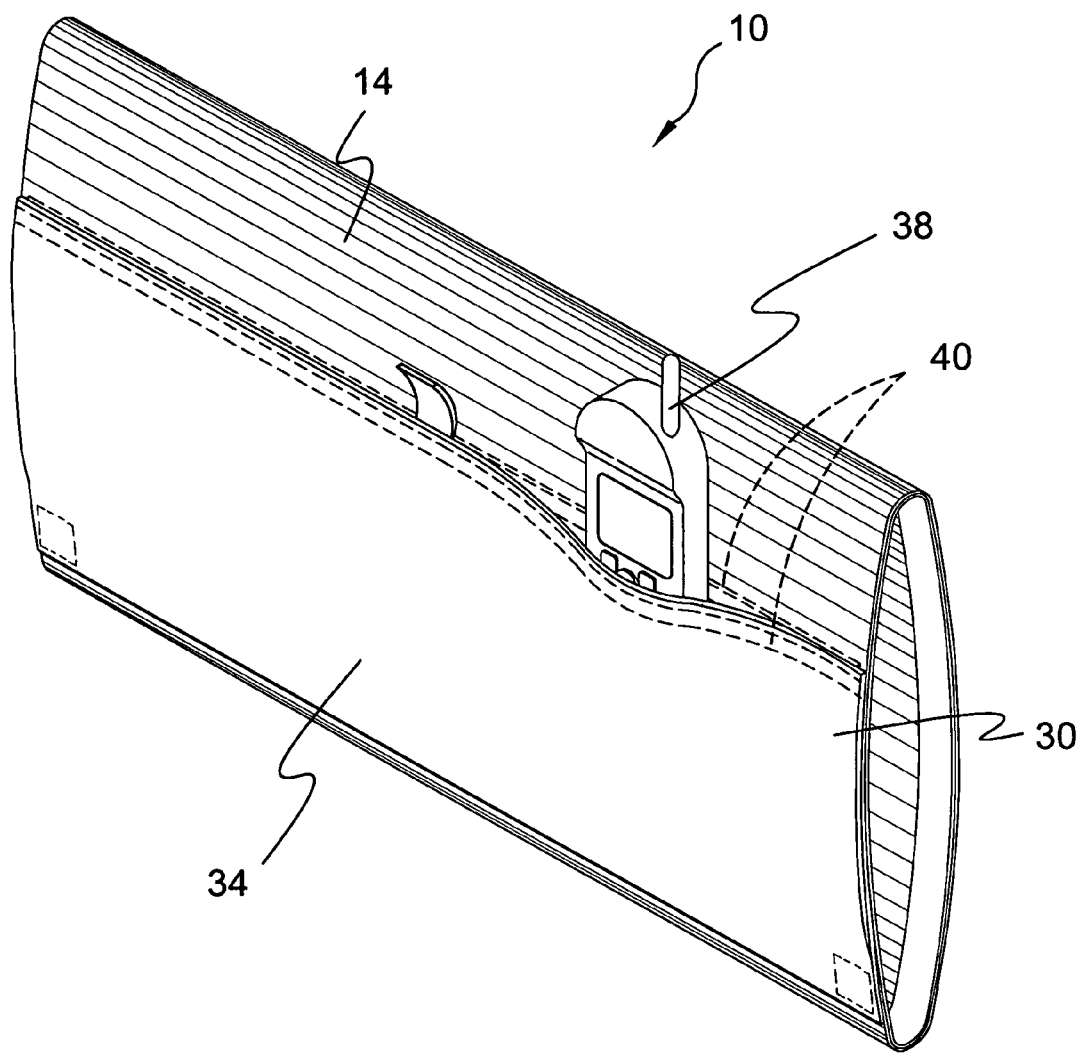
Figure 10:
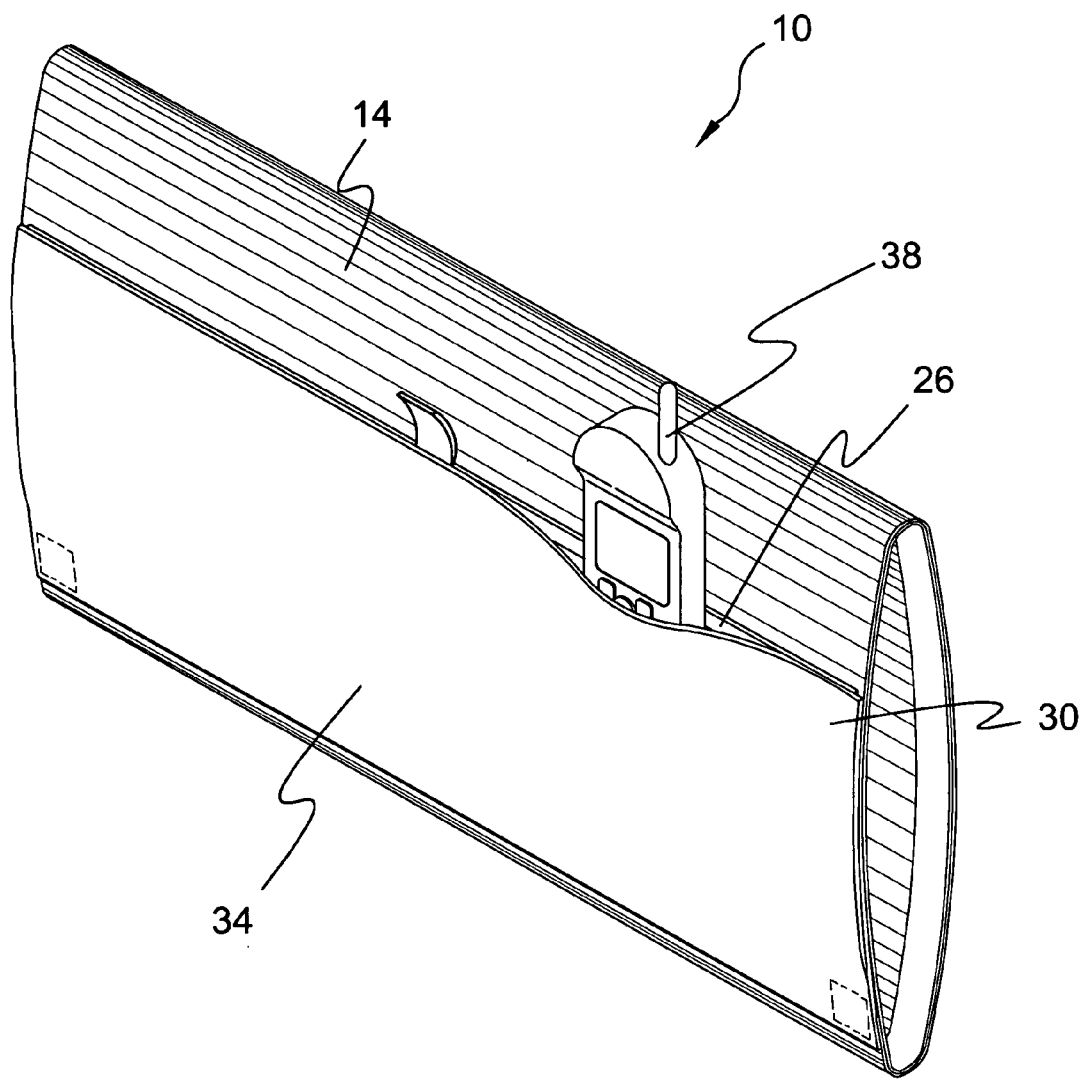
Figure 11:
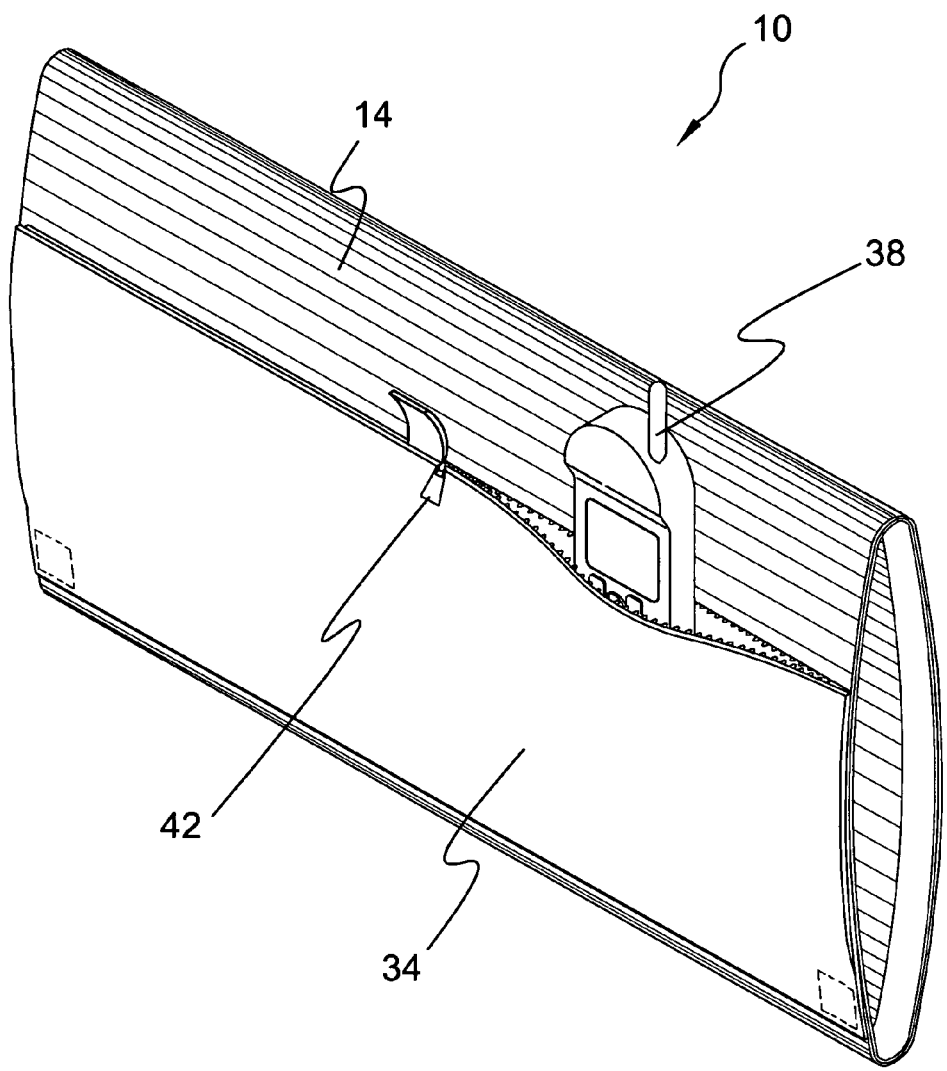
Figure 12:
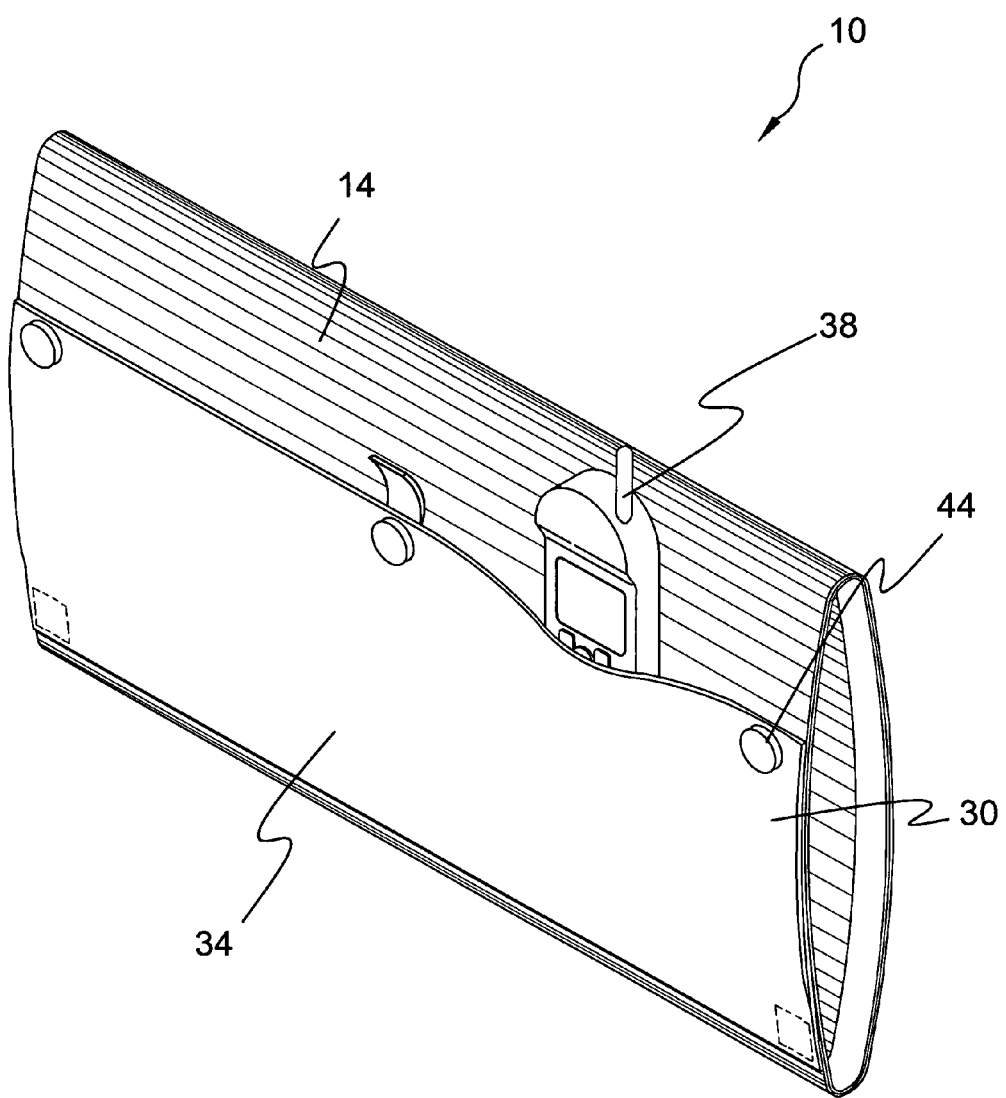
Figure 13:
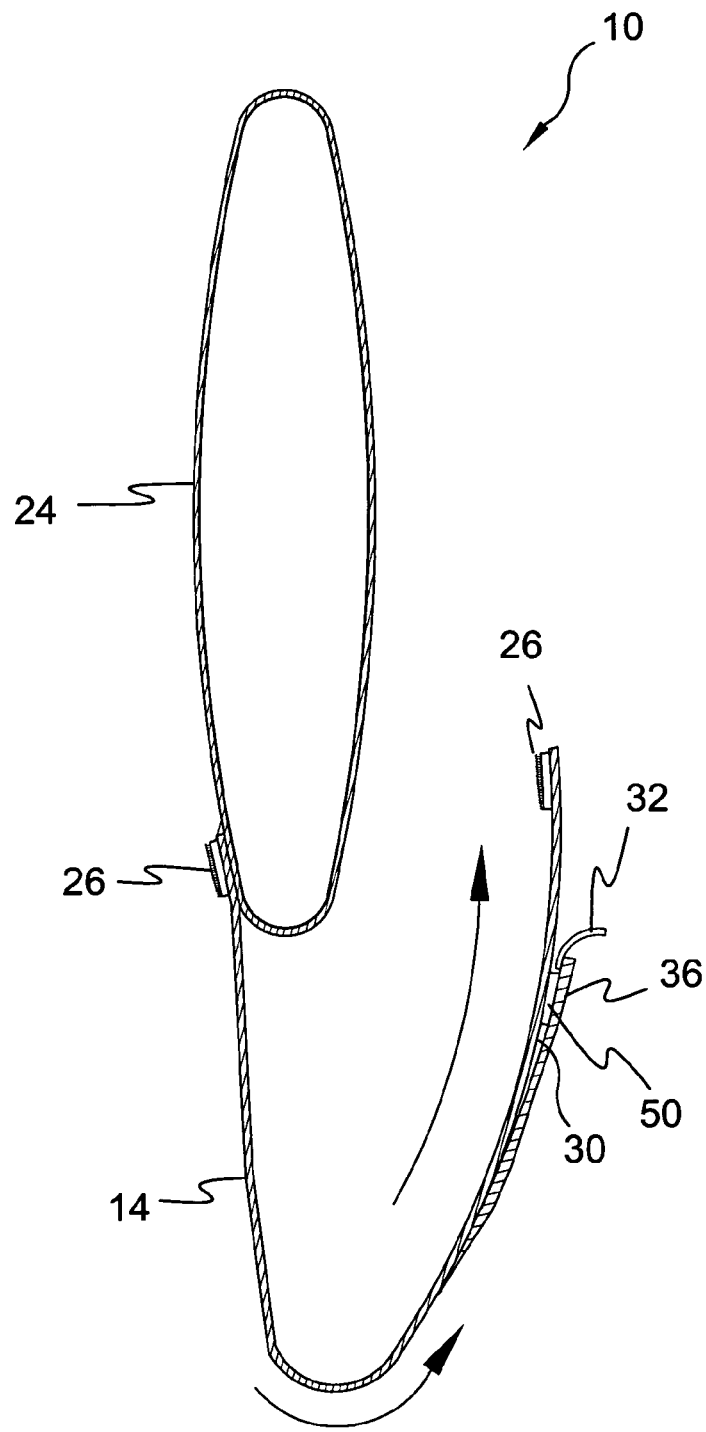
Figure 14:
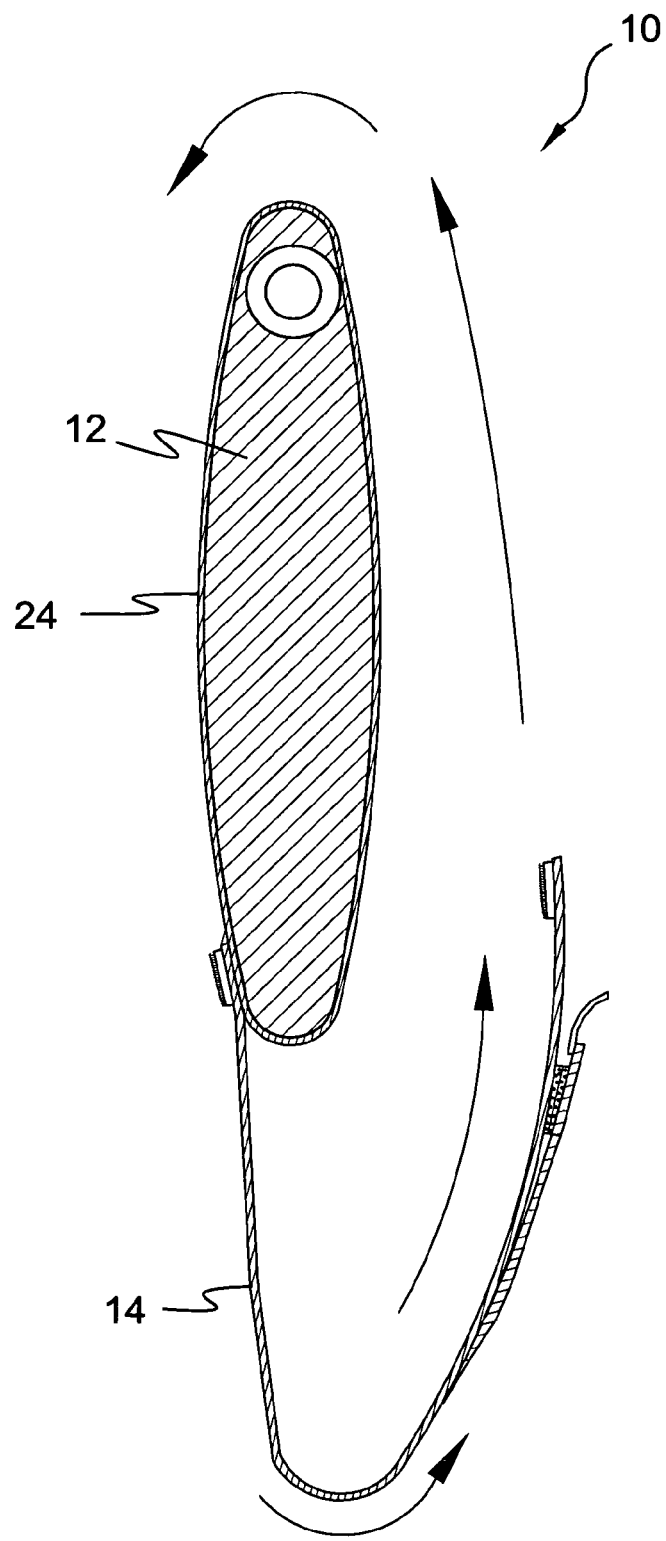
Figure 15:
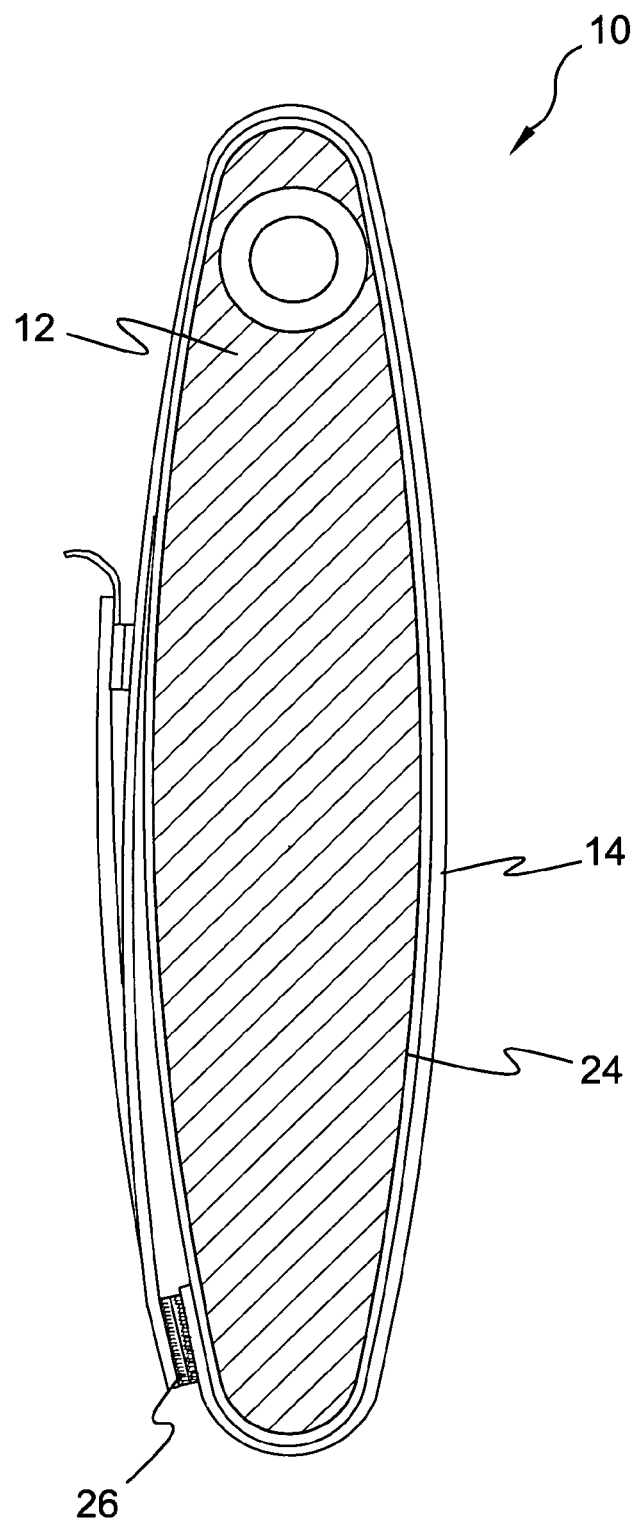
Figure 16:
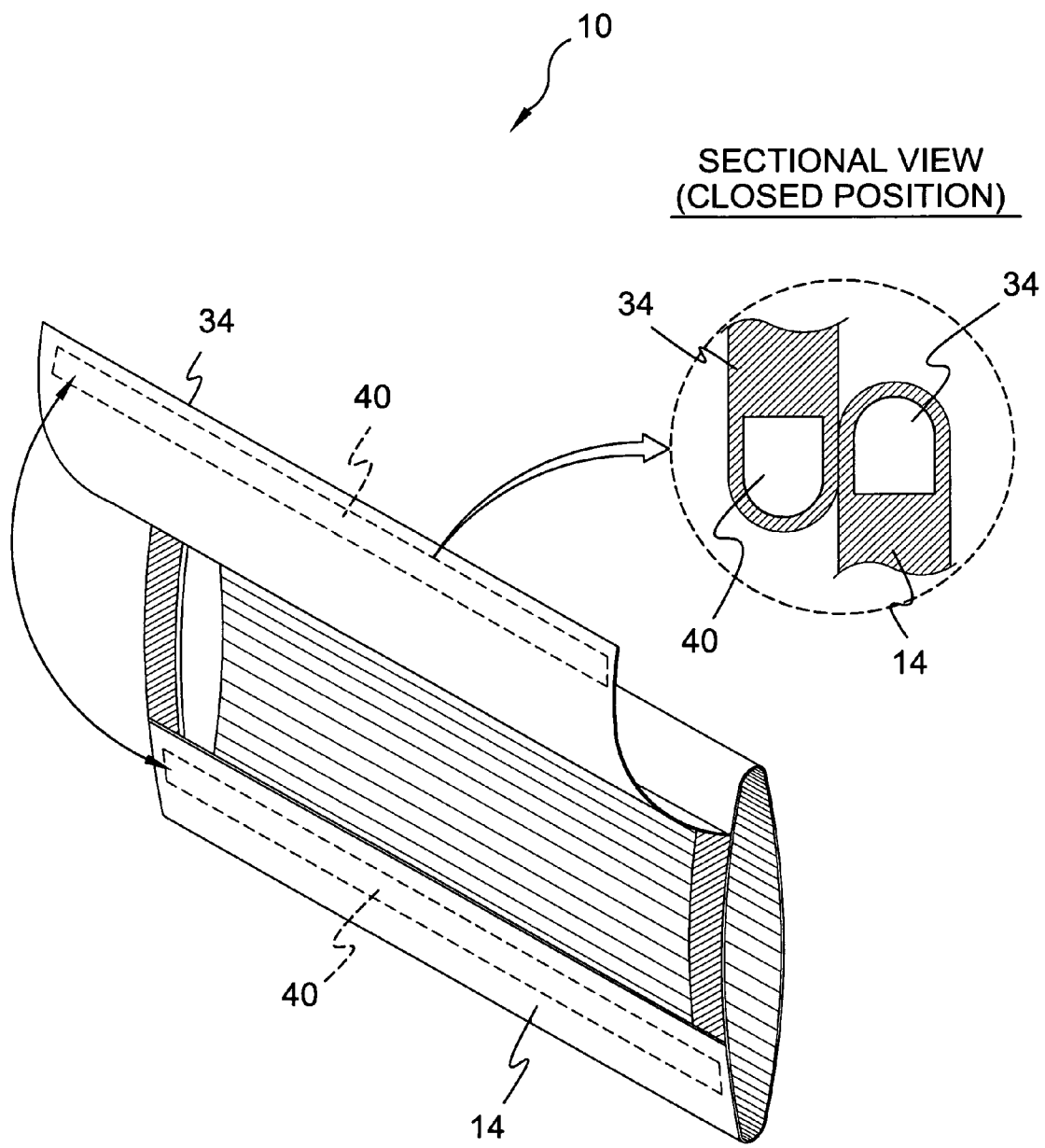
Figure 17:
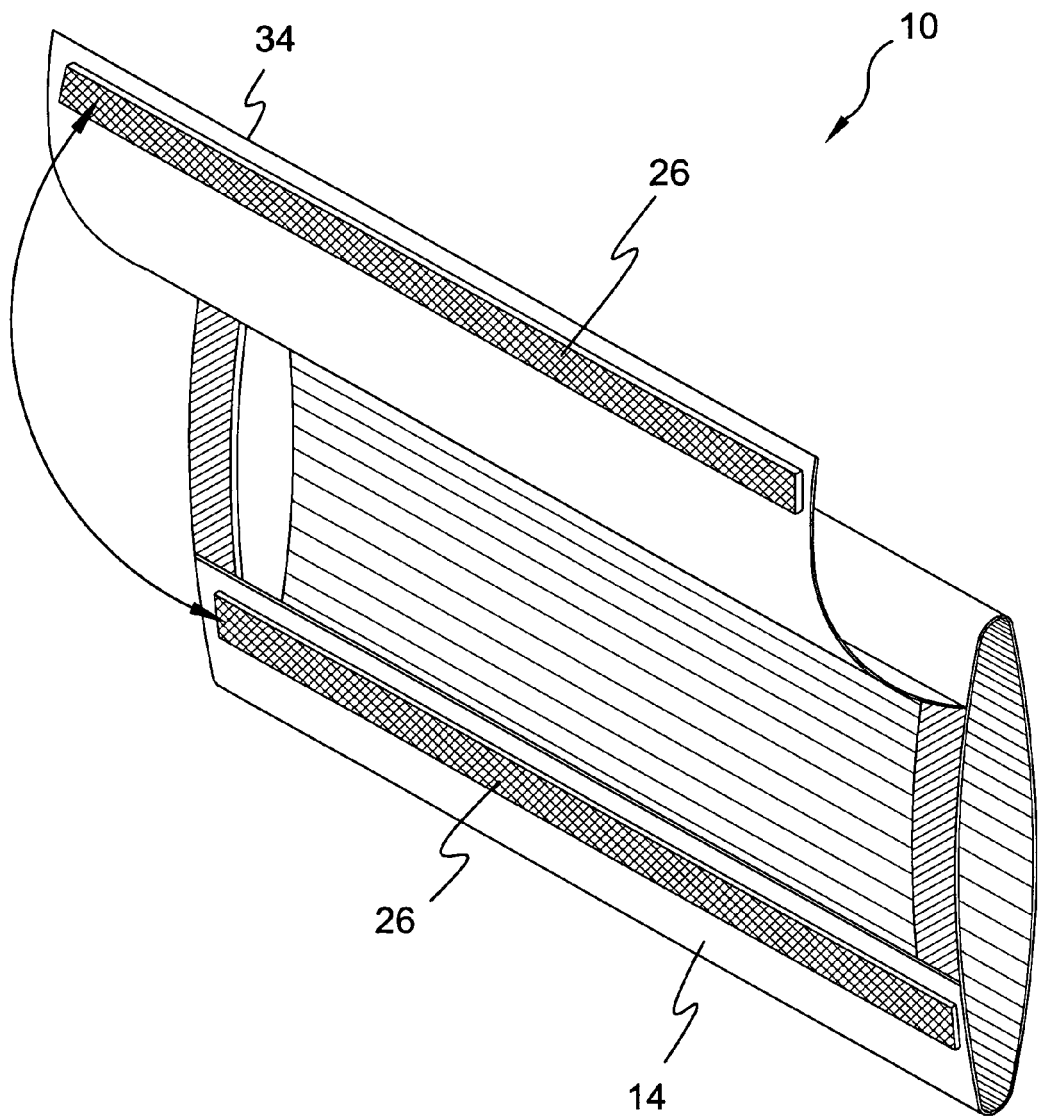
Figure 18:
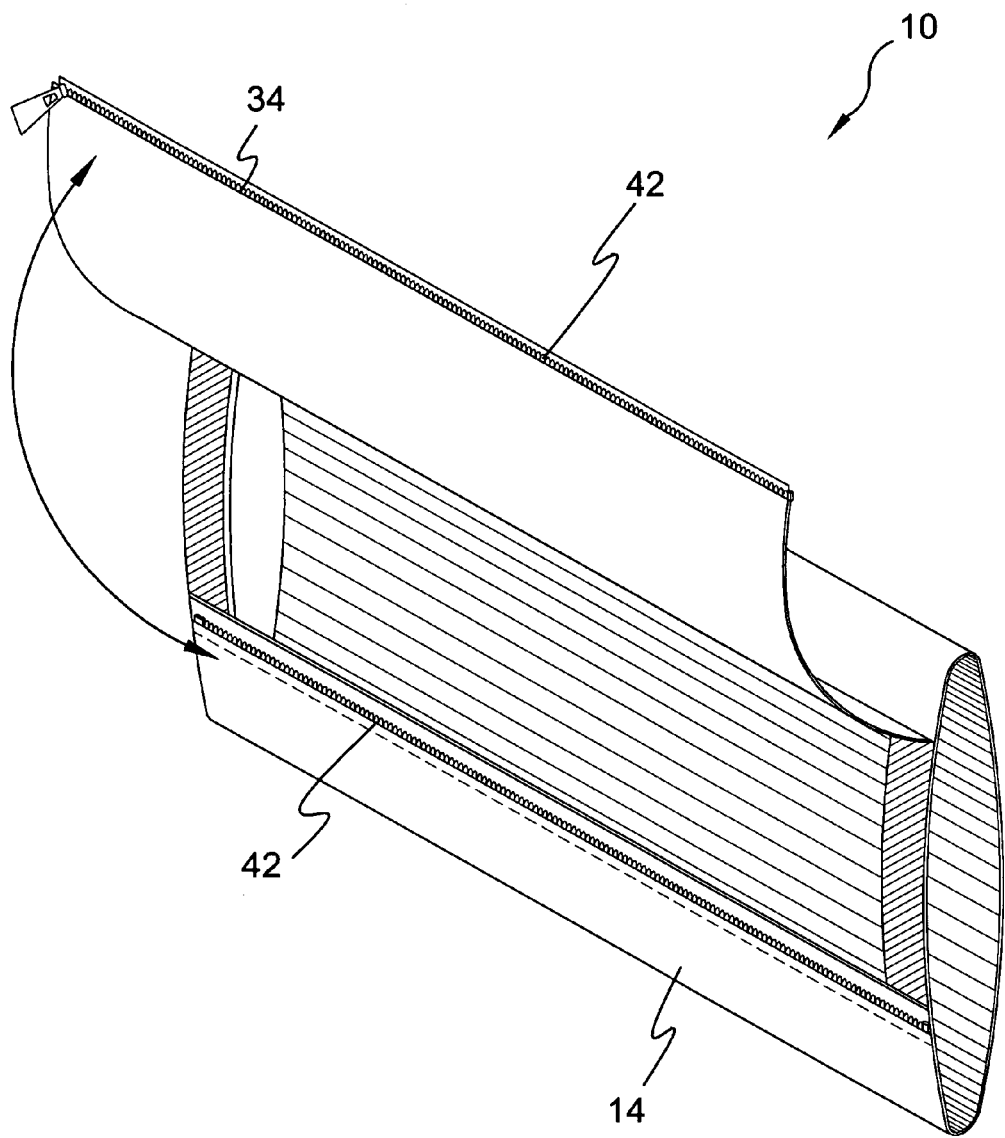
Figure 19:
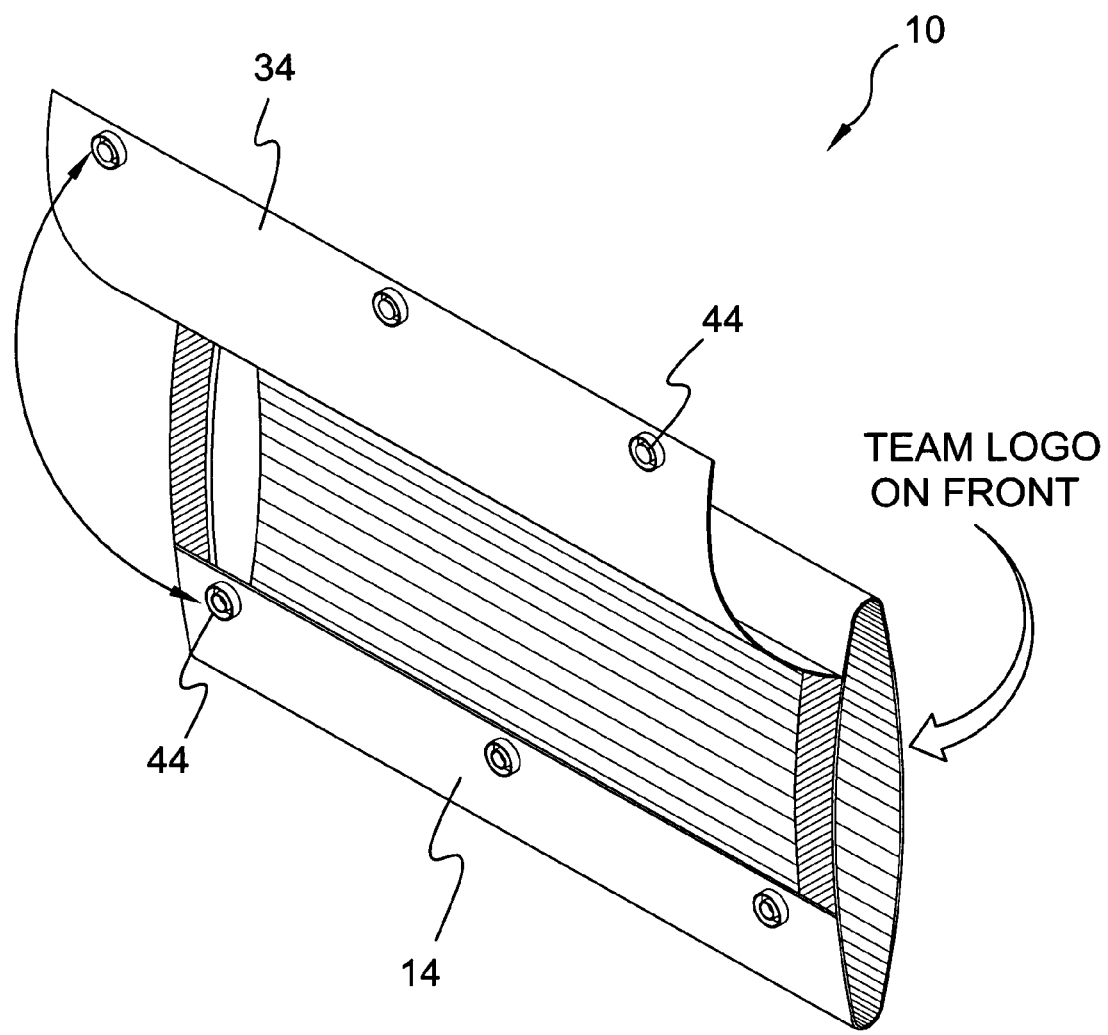

In order that the invention may be more fully understood, it will now be described, by way of example, with reference to the accompanying drawing in which:

FIG. 1 is an illustrative view of the present invention in use.
FIG. 2 is an assembly view of the present invention.
FIG. 3 is an illustrative view of the present invention in use.
FIG. 4 is a perspective view of the present invention prior to attachment to a sun visor.
FIG. 5 is a perspective view of the present invention.
FIG. 6 is a perspective view of the present invention.
FIG. 7 is a perspective view of the present invention.
FIG. 8 is a perspective view of the present invention.
FIG. 9 is a perspective of the present invention.
FIG. 10 is a perspective view of the present invention.
FIG. 11 is a perspective view of the present invention.
FIG. 12 is a perspective view of the present invention.
FIG. 13 is a sectional view of the present invention.
FIG. 14 is a sectional view of the present invention.
FIG. 15 is a sectional view of the present invention.
FIG. 16 is a rear view of the present invention.
FIG. 17 is a rear view of the present invention.
FIG. 18 is a rear view of the present invention.
FIG. 19 is a rear view of the present invention.

DESCRIPTION OF THE REFERENCED NUMERALS

Turning now descriptively to the drawings, in which similar reference characters denote similar elements throughout the several views, the figures illustrate the Ornamental Sun Visor of the present invention. With regard to the reference numerals used, the following numbering is used throughout the various drawing figures.

10 Ornamental Sun Visor of the present invention
12 sun visor
14 visor cover sheet
16 front surface of 14
18 logo/indicia
20 vehicle
22 windshield
24 elastic band
26 Velcro fastener element
28 sun visor mirror
30 pocket
32 pull tab
34 mirror flap
36 visor mirror cover
38 cell phone
40 magnetic fastener
42 zipper
44 snap button fastener
46 inner side of 14
48 outer side of 14
50 fastener element

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention is an ornamental sun visor cover 10 that fits any vehicle sun visor 12, square, rectangular, oval or circular in shape and having personalized ornamental designs or indicia 18 on its front surface 16 which is visible through the windshield 22 of the vehicle 20 when in the down position. The sun visor cover 10 provides elastic strips that allow it to be stretched and slipped over a vehicles sun visor 12, then the visor cover sheet 14 is wrapped around the visor 12 and secured by Velcro means.

FIG. 2 is an assembly view of the present invention 10. Shown is a chart of steps used in the mounting of the sun visor cover sheet 12. The sun visor sheet 14 provides elastic strips 24 that allows it to be stretched and slipped over a vehicles sun visor 12, then the visor cover sheet 14 is wrapped around the visor 12 and secured by Velcro 26 means. A sun visor mirror flap 34 is provided having a pocket 30 that is sealed by means of Velcro 26. To expose the visor mirror 28, the flap 34 is separated from its mating Velcro 26 and lifted to reveal the mirror 28 through the open pocket 30.

FIG. 3 is an illustrative view of the present invention 10 in use. The sun visor cover sheet 14 is installed on the visor 12 with elastic bands 24 and the mirror flap 34 is removed from its Velcro 26 securing means to reveal the mirror 28 and open mirror cover 36.

FIG. 4 is a perspective view of the present invention 10 prior to attachment to a sun visor. The sun visor cover provides a flexible visor cover sheet 14 with elastic bands 24 that allows it to be stretched and slipped over a vehicles sun visor, then the visor cover sheet 14 is wrapped around the visor and secured by Velcro 26 means. A sun visor mirror flap 34 is provided, having a pocket 30 that is sealed by means of Velcro 26. The mirror flap 34 forming the pocket 30 can be mesh, clear plastic or fabric. To utilize the visor mirror, the pull tab 32 is used to separate the flap 34 from its mating Velcro 26 elements and lifted to reveal the mirror.

FIG. 5 is a perspective view of the present invention 10. For installation the elastic bands 24 are slid over opposing sides of the sun visor and the visor cover sheet 14 is wrapped therearound secured by the mating Velcro 26 elements.

FIG. 6 is a perspective view of the present invention 10. For installation the elastic bands 24 are slid over opposing sides of the sun visor and the visor cover sheet 14 is wrapped therearound secured by the mating Velcro 26 elements.

FIG. 7 is a perspective view of the present invention 10. Shown is the visor cover sheet 14 fully secured by the elastic bands 24 and mating Velcro 26 elements. The visor mirror flap 34 is closed with mating Velcro 26 elements to form a pocket 30 that can be opened with a pull tab 32.

FIG. 8 is a perspective view of the present invention 10. Shown is the visor cover sheet 14 installed and the mirror cover flap 34 closed. A portion of the mating Velcro 26 strips securing the flap 34 are separated to provide access to the pocket 30 for accessory items such as the cell phone 38 depicted here.

FIG. 9 is a perspective of the present invention. 10 utilizing magnetic strips 40 to secure the mirror cover flap 34. Shown is the visor cover sheet 14 installed and the mirror cover flap 34 closed. A portion of the mating magnetic strips 40 securing the flap 34 are separated to provide access to the pocket 30 for accessory items such as the cell phone 38 depicted here.

FIG. 10 is a perspective view of the present invention 10. Shown is the visor cover sheet 14 installed and the mirror cover flap 34 closed. A portion of the mating Velcro 26 strips securing the flap 34 are separated to provide access to the pocket 30 for accessory items such as the cell phone 38 depicted here.

FIG. 11 is a perspective view of the present invention 10. The fastener element utilized in this figure for providing access to the pocket 30 between the mirror visor flap 34 and the visor cover sheet 14 is a zipper 42 that is in the open position with a cell phone 38 placed therein.

FIG. 12 is a perspective view of the present invention 10. Shown is the sun visor cover 10 depicting a cellular phone 38 within the pocket 30. The pocket is secured closed by a plurality of mating snap button fasteners 44 disposed on the mirror flap 34 and the visor cover sheet 14.

FIG. 13 is a sectional view of the present invention 10. Shown is the sun visor sheet 14 having elastic bands 24 attached thereto and an inner side 46 having a Velcro 26 fastener and an outer side 48 with a mating Velcro 26 fastener element. A visor mirror cover 36 with a pull tab 32 is disposed on the visor cover sheet 14 forming a pocket 30 and is secured thereto with mating fastener elements 50.

FIG. 14 is a sectional view of the present invention 10. Shown are the elastic bands 24 secured to the sun visor 12 and the visor cover sheet 14 being wrapped therearound.

FIG. 15 is a sectional view of the present invention 10. Shown are the elastic bands 24 secured to the sun visor 12 and the visor cover sheet 14 wrapped therearound and secured in place with Velcro 26 fastener elements.

FIG. 16 is a rear view of the present invention 10. Shown are the visor cover sheet 14 and the mirror flap 34 having integral mating magnetic strips 40 as the closure means.

FIG. 17 is a rear view of the present invention 10. Shown is the visor cover sheet 14 and the mirror flap 34 having mating Velcro 26 strips as the closure means.

FIG. 18 is a rear view of the present invention 10. Shown are the visor cover sheet 14 and the mirror flap 34 having mating zipper elements 42 as the closure means.

FIG. 19 is a rear view of the present invention 10. Shown is the visor cover sheet 14 and the mirror flap 34 having a plurality of spaced apart mating snap buttons 44 as the closure means.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. An ornamental sun visor cover that can be easily installed, used and removed without impinging the functionality of said sun visor comprising:
   a) a flexible visor cover sheet that wraps around said sun visor and has an inner side and an outer side;
   b) a preliminary attachment means disposed on one edge of said flexible visor cover sheet for fastening and maintaining position thereof to said sun visor;
   c) a releasable securing means for retaining said flexible sheet in the wrapped around position once fully installed; and
   d) wherein said preliminary attachment means is a pair of spaced apart, looped elastic bands that are slid over the unattached end of said sun visor and pulled apart until said visor cover sheet is taut on said sun visor and retains it in position during use and aids in ease of installation when wrapping it around said sun visor.

2. The ornamental sun visor cover recited in claim 1, wherein said releasable securing means for said visor cover sheet are mating hook and loop fastener elements disposed on said inner side at one edge and said outer side on the opposing edge thereof.

3. The ornamental sun visor cover recited in claim 1, wherein said visor cover sheet includes indicia disposed on the outer side thereof and positioned to be visible through the windshield of the vehicle when in the down position.

4. The ornamental sun visor cover recited in claim 3, wherein said visor cover sheet further includes indicia disposed on said outer side thereof and positioned to be viewed by vehicle occupants when in the down position.

5. The ornamental sun visor cover recited in claim 1, further including means for selectively revealing a minor integral with said sun visor.

6. The ornamental sun visor cover recited in claim 5, wherein said minor revealing means is a releasable flap on the portion of said visor cover sheet corresponding with said sun visor mirror.

7. The ornamental sun visor cover recited in claim 6, wherein said releasable mirror flap has one edge bonded to said visor cover sheet and a releasable securing means at the opposing edge.

8. The ornamental sun visor cover recited in claim 7, wherein said releasable securing means of said mirror flap is mating hook and loop fastener elements disposed on said outer side of said visor cover sheet and said inner side of said mirror flap.

9. The ornamental sun visor cover recited in claim 7, wherein said releasable securing means of said mirror flap is mating magnetic strips disposed on said outer side of said visor cover sheet and said inner side of said minor flap.

10. The ornamental sun visor cover recited in claim 7, wherein said releasable securing means of said mirror flap is a plurality of spaced apart snap buttons disposed on said outer side of said visor cover sheet and said inner side of said minor flap.

11. The ornamental sun visor cover recited in claim 7, wherein partially opening said releasable securing means provides access to an accessory storage pocket.

12. The ornamental sun visor cover recited in claim 7, wherein said releasably securable mirror flap edge includes a pull tab to aid in opening said mirror flap.

13. The ornamental sun visor cover recited in claim 11, wherein said pocket is fabricated from the group of clear plastic, mesh and material.

\* \* \* \* \*